United States Patent [19]
Fiacco

[11] Patent Number: 6,004,365
[45] Date of Patent: Dec. 21, 1999

[54] AIR FILTERING DEVICE

[76] Inventor: Paul Fiacco, 1134 Armstrong Ct., Derby, Kans. 67037

[21] Appl. No.: 08/953,598

[22] Filed: Oct. 17, 1997

[51] Int. Cl.[6] .............................. B01D 45/12; B01D 33/00
[52] U.S. Cl. .................................. 55/400; 55/471; 55/473; 55/507; 55/510; 55/511
[58] Field of Search ................................. 55/385.1, 385.2, 55/467, 471, 472, 473, 511, 501, 498, 400, 404, 405, 407, 408, 505, 507, 510; 454/230; 416/146 R

[56] References Cited

U.S. PATENT DOCUMENTS

| | | | |
|---|---|---|---|
| 2,114,761 | 4/1938 | Crider | 55/471 |
| 4,173,458 | 11/1979 | Stiles | 55/405 |
| 4,849,862 | 7/1989 | Diskin et al. | 55/385.1 |
| 5,564,900 | 10/1996 | McAuley | 416/62 |

FOREIGN PATENT DOCUMENTS

| | | | |
|---|---|---|---|
| 1233668 | of 0000 | France | 55/400 |
| 2378555 | 9/1978 | France | 55/400 |
| 55-82246 | 6/1980 | Japan | 55/400 |
| 63-118550 | 5/1988 | Japan | 454/230 |

*Primary Examiner*—David A. Simmons
*Assistant Examiner*—Robert A. Hopkins
*Attorney, Agent, or Firm*—Shook, Hardy & Bacon L.L.P.

[57] ABSTRACT

An air filtering device including a circular plate, plurality of fan blades fixedly attached to the circular plate, the fan blades extending downwardly from the lower surface of the circular plate; a filter frame having an air permeable cylindrical inner wall, having an upper wall, having a lower wall, and having an air permeable cylindrical outer wall, the air permeable cylindrical inner wall, the air permeable cylindrical outer wall, the upper wall and the lower wall defining a cylindrical filter media containing space; air filtering media extending annularly around the air permeable cylindrical inner wall within the cylindrical filter media containing space; and, a filter frame attaching mechanism attaching the filter frame so that it extends annularly around the outer edges of the fan blades.

18 Claims, 6 Drawing Sheets

AIR FILTERING DEVICE

FIELD OF THE INVENTION

This invention relates to air filters. In particular, this invention relates to air filters incorporating filtering media and a centrifugal fan, the centrifugal fan preferably being attachable to the rotor plate of a common ceiling fan.

BACKGROUND OF THE INVENTION

Air in homes or in business workplaces typically includes a colloid suspension of smoke particles, plant pollens, mold spores, and dust particles. Cigarette smoke suspended in the air of a home or a workplace, commonly known as second-hand smoke, is widely suspected as being a carcinogen. Pollen and mold spores suspended in the air of a home or a workplace are common allergens which may cause sinusitis or hayfever, and other respiratory ailments. Dust suspended in the air may be harmful to persons in a home or workplace who have emphysema or asthma. Additionally, airborne smoke and dust tends to discolor and soil items in a home or workplace such as curtains and furniture. Thus, it is widely seen as desireable to create home and workplace environments whose air is substantially free of airborne smoke, pollen, mold spores, and dust.

Several types of apparatus for cleaning and filtering air within a home or workplace are known. Many have disadvantages. For example, free standing electric air cleaning machines, typically incorporating an air impeller and a filtering medium mounted in the path of air flow, take up useable space within a room and typically create undesirable background noise. Another air filtering device having disadvantages is a carbon filter or an electrostatic air filter which is installable as an auxiliary element of a building's central air and heating system. Such systems are mechanically complex, and are expensive to construct, maintain, and operate.

The instant inventive air filtering device overcomes such disadvantages, among others, by providing a mechanically simple air filter which is economical to construct and operate, which takes up virtually no living or working space of a home or workplace, and which creates virtually no background noise. Such benefits are obtained through the provision of a centrifugal fan having a filtering media attached thereto and disposed therearound, the centrifugal fan and filtering media assembly being attachable to and rotatable by the rotor plate of a common ceiling fan; such ceiling fan having its fan blades removed.

PRIOR ART PATENTS

U.S. Pat. No. 4,849,862 issued Jul. 18, 1989, to Diskin, et al., discloses a ceiling suspended air purifying light fixture.

U.S. Pat. No. 4,750,863 issued Jun. 14, 1988, to Scoggins discloses a fan shroud filter.

U.S. Pat. No. 4,450,756 issued May 29, 1984, to Kling discloses a fume exhaust device.

U.S. Pat. No. 4,840,650 issued Jun. 20, 1989, to Matherne discloses a ceiling fan filter.

U.S. Pat. No. 4,422,824 issued Jun. 27, 1983, to Eisenhardt discloses a germ killing ceiling fan.

U.S. Pat. No. 4,790,863 issued Dec. 13, 1988, to Nobiraki discloses an air cleaner incorporating a centrifugal fan.

U.S. Pat. No. 5,443,625 issued Aug. 22, 1995, to Schaffhausen discloses an air filtering fixture.

U.S. Pat. No. 4,676,721 issued Jun. 30, 1987, to Hardee discloses a ceiling fan air cleaner.

None of the above disclosed patents disclose, teach or describe the novel, inventive, useful and unique characteristics and features of the present inventive air filtering device.

BRIEF SUMMARY OF THE INVENTION

The present inventive air filtering device comprises an upper circular plate, preferably between three and four feet in diameter, the circular plate being adapted for fixed attachment to and rotation by the rotor plate of a common ceiling fan; such ceiling fan having its fan blades removed.

Upon removal of the fan blades of, for example, a common four bladed ceiling fan, screw receiving fan blade attachment apertures of the ceiling fan's rotor plate are exposed. Typically, the lower surface of such rotor plate is elevated above the lower surface of the ceiling fan's motor housing. The upper circular plate of the present inventive air filtering device preferably extends conically upward, such upward extension terminating in a flattened circular upper end which is fitted for attachment to the rotor plate of the ceiling fan. Screw receiving filter attachment apertures are either drilled into or molded into the flattened upper end of the circular plate, such apertures being positioned and aligned so that they may underlie the fan blade attachment apertures of the ceiling fan's rotor plate. Also, a light fixture shaft aperture may be drilled or molded into such flattened open end. Such configuration of the upper circular plate and the filter attachment apertures allows the air filtering device to be easily and conveniently attached to the rotor plate by means of screws or bolts.

A multiplicity of fan blades are fixedly attached to or molded as a part of the lower surface of the circular plate so that they extend downwardly therefrom; the fan blades being radially configured and aligned in conformity with the common configuration of the blades of a centrifugal fan or pump. Upon operation of the ceiling fan motor to rotate the upper circular plate along with the blades extending therefrom, the blades centrifugally accelerate air outwardly in all radial directions.

Lower structural support of the blades is preferably provided by an annular ring which is molded as a part of or fixedly attached to the lower outside corners of the blades. Preferably, the annular ring presents an outwardly facing peripheral surface extending annularly around the outer edges of the fan blades. The outwardly facing peripheral surface preferably has a snap ridge receiving channel extending annularly therearound; the snap ridge receiving channel serving the function of securely and interchangeably holding a cylindrical air filter retaining frame containing an air filtering medium.

The air filter retaining frame preferably comprises a plastic downwardly opening U-channel ring, and a plastic upwardly opening U-channel ring, the U-channel rings preferably being interconnected by a pair of concentric cylindrical wire mesh walls. Preferably, the upper and lower edges of the wire mesh walls are respectively embedded within and held by the lower and upper surfaces of the U-channel rings. The combination of the upper and lower U-channel rings, and the concentric wire mesh walls defines a cylindrical filtering medium retaining and supporting space. Within such space, any of several air filtering media may be deposited. Suitable air filtering media which may be deposited within such cylindrical space are activated charcoal, a pleated fiberglass mesh, pleated woven fabric filters either chemically treated or impregnated with activated charcoal, high efficiency particle arresting (HEPA) filters, or continuations of such filter media.

A snap ridge is preferably molded as a part of the lower U-channel ring so that the snap ridge extends inwardly from such ring's inwardly facing surface. Preferably, the filter retaining frame is closely fitted to the fan blades so that it may be slidably mounted over the outer edges of the fan blades, and so that it may be manually pressed into place, causing the snap ridge to snap into place within the snap ridge receiving channel of the annular ring. Removal and replacement of the air filter retaining frame is conveniently accomplished by manually pulling the air filter retaining frame downwardly, away from the blades, causing such frame to slide away from the fan blades. An opposite upward sliding motion imposed upon a new air filtering frame containing a fresh air filter medium replaces the removed air filter retaining frame.

In operation, upon rotation of the assembled air filtering device by the motor of a ceiling fan, air is drawn upward into the interior space of the air filtering device, and the air is centrifugally accelerated outward in all radial directions by the fan blades. The air then flows through the air filter retaining frame and through the air filtering medium contained therein. Such flow of air accomplishes continuous and noiseless filtration of the air, and accomplishes desireable air circulation.

Accordingly, it is an object of the present invention to provide an air filtering device which is readily installable upon the rotor plate of a common ceiling fan; such ceiling fan having its fan blades removed.

It is a further object of the present invention to provide such an air filtering device which utilizes centrifugal fan blades for accelerating the air.

It is a further object of the present invention to provide such an air filtering device further having an air filter retaining frame containing an air filtering medium, such frame being annularly mounted around the outer periphery of the centrifugal fan blades.

It is a further object of the present invention to provide such an air filtering device further providing a snap ridge and a snap ridge receiving channel for easy installation, removal, and replacement of the air filter retaining frame.

It is a further object of the present invention to provide such an air filtering device which is economically constructed, and which is quiet in operation.

Other and further objects, benefits, and advantages of the present inventive air filtering device will become known to those skilled in the art upon review of the Detailed Description which follows, and upon review of the appended drawings.

DETAILED DESCRIPTION OF THE PREFERRED EMBODIMENT

Figure 1:
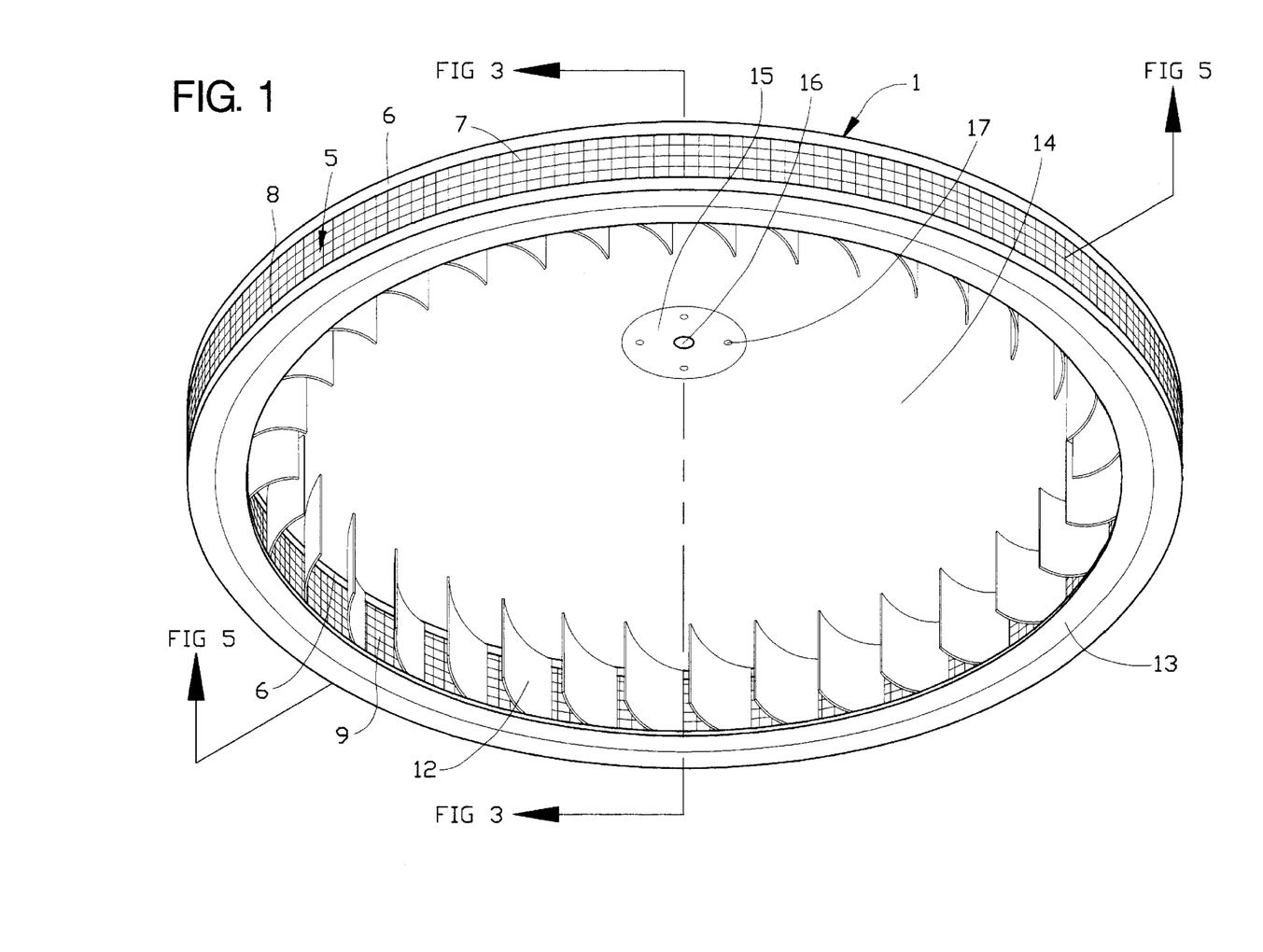
FIG. 1 is an isometric view of the air filtering device, viewed from below.
Figure 2:
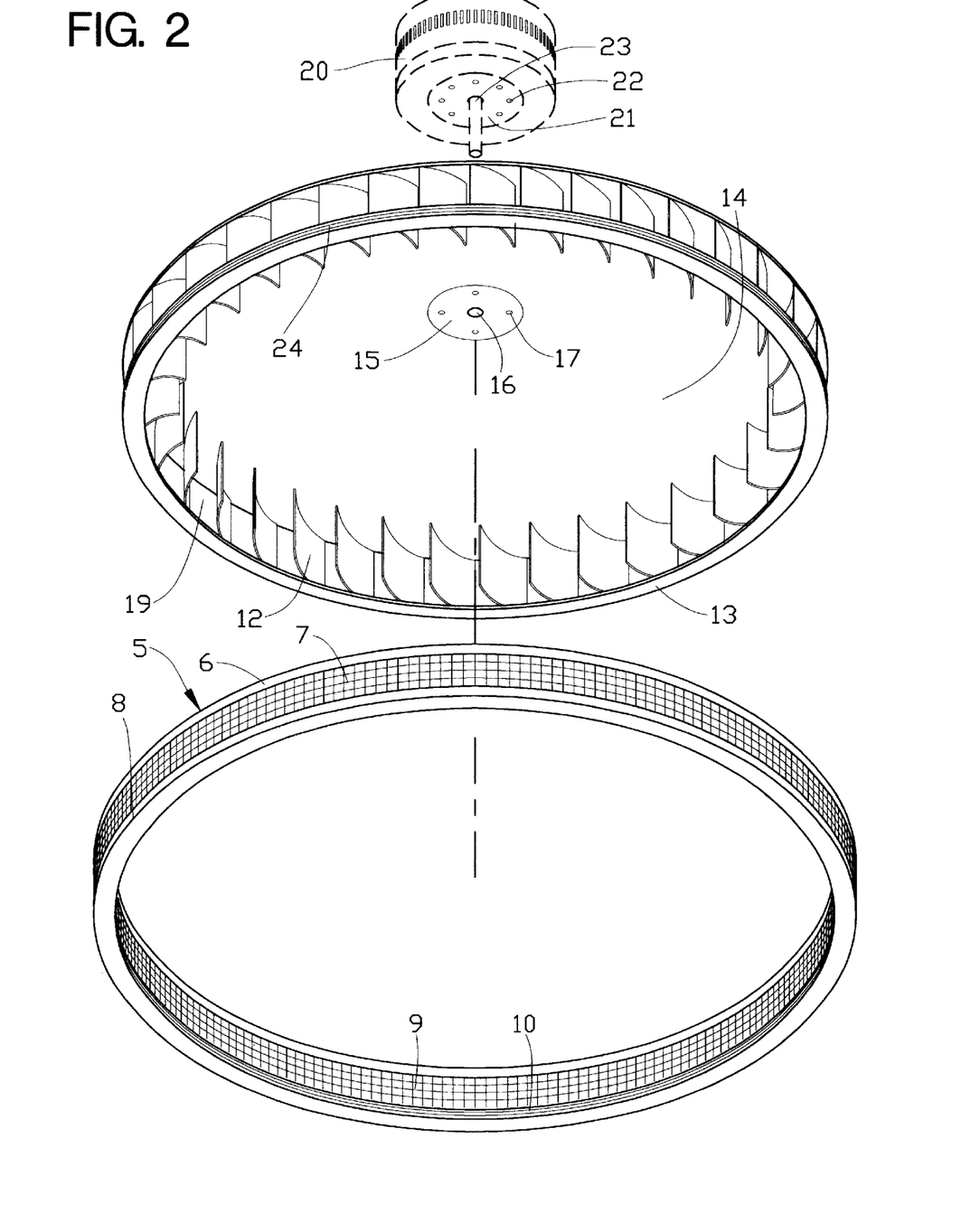
FIG. 2 is an exploded isometric view of the air filtering device, viewed from below.

Referring now to the drawings, and in particular to FIG. 2, the fan blades of a common ceiling fan (not shown) are removed from the ceiling fan's motor 20, exposing a ceiling fan rotor plate 21, and screw receiving fan blade attachment apertures 22. A light fixture (not shown) attached to the ceiling fan is also removed, exposing a light fixture attachment shaft 23. Upon removal of such light fixture and ceiling fan blades, the ceiling fan is ready for installation of the air filtering device which, referring to FIG. 1, is referred to generally as drawing element 1.

Figure 3:
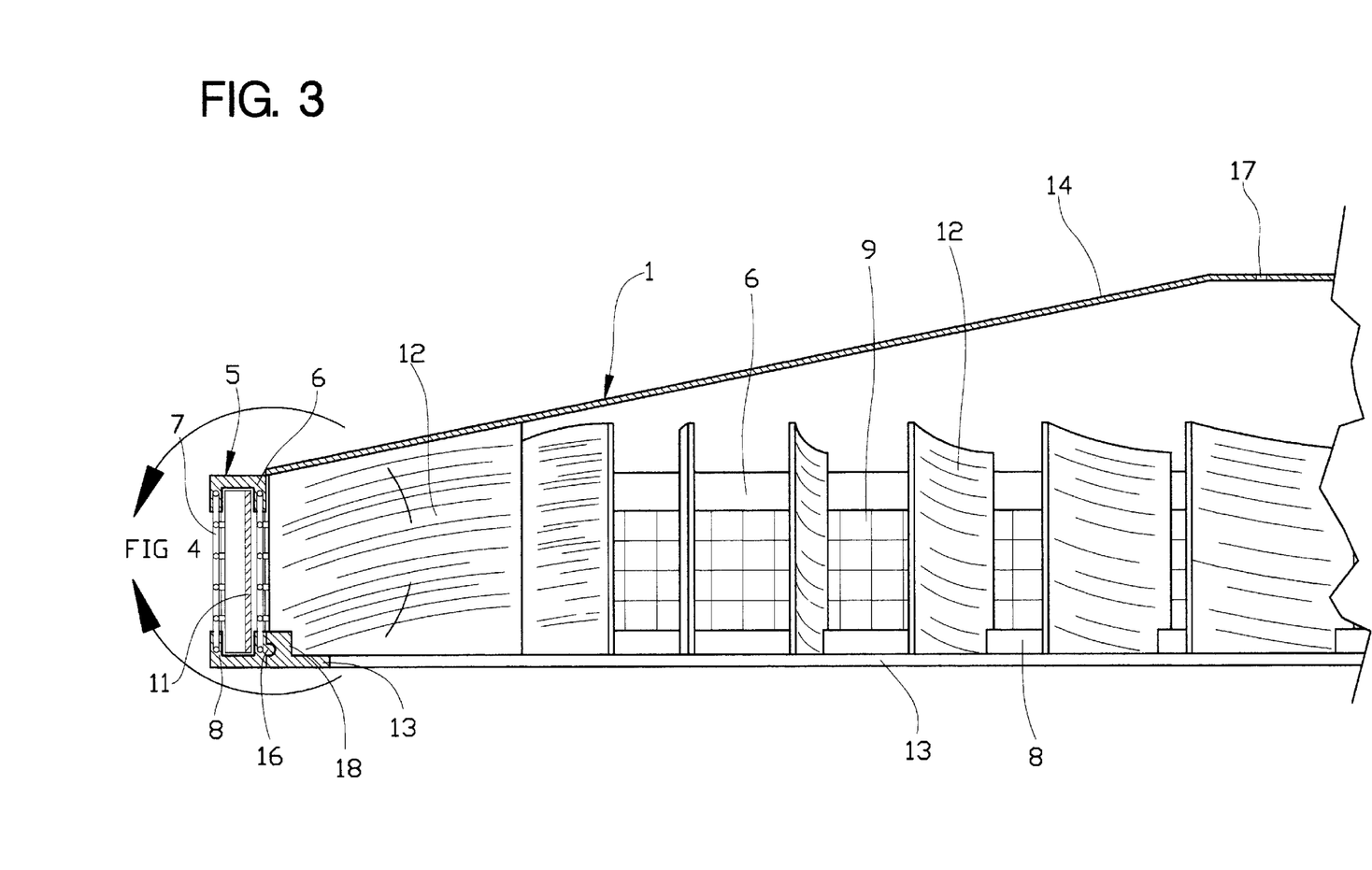
FIG. 3 is a partial sectional view of the air filtering device; the sectional plane being vertical, passing diameterally through the device.

Referring simultaneously to FIGS. 1 and 3, the upper circular plate 14 of the air filtering device 1 is preferably between three and four feet in diameter. Preferably, the upper circular plate 14 extends conically upward terminating in a flattened circular area 15, such area being fitted for flush mounting against, referring to FIG. 2, the rotor plate 21 of the ceiling fan. Referring to FIG. 3, the upward slope of the conical section may commence (as shown) at the outer periphery of the upper circular plate 14 or, alternately, such slope may commence at the inner edges of the fan blades 12. The flattened circular area 15 preferably has four screw receiving air filter attachment apertures 17 and a central light fixture attachment aperture 16. Where the rotor plate 21 is adapted for attachment of five ceiling fan blades, five air filter attachment apertures in a pentagonal configuration are utilized. Upon attachment of the circular plate 14 to, referring to FIG. 2, the rotor plate 21, by means of screws passing through the screw receiving apertures 17 and 22, the circular plate 14 may be rotatably driven by the ceiling fan motor 20. A light fixture (not shown) may be reinstalled upon the light fixture attachment shaft 23 which extends through the light fixture receiving aperture 16.

Referring again to FIG. 1, thirty-four curved fan blades 12 extend vertically downward from the lower surface of the upper circular plate 14. Preferably, the fan blades 12 are homogeneously fused to the circular plate 14 through an injection molding process. Depending upon the overall diameter of the air filtering device, a greater or a lesser number of fan blades may be utilized. Each fan blade 12 is outwardly arcuately curved and is tilted in the direction of normal rotation for added efficiency in radial acceleration of air.

Figure 4:
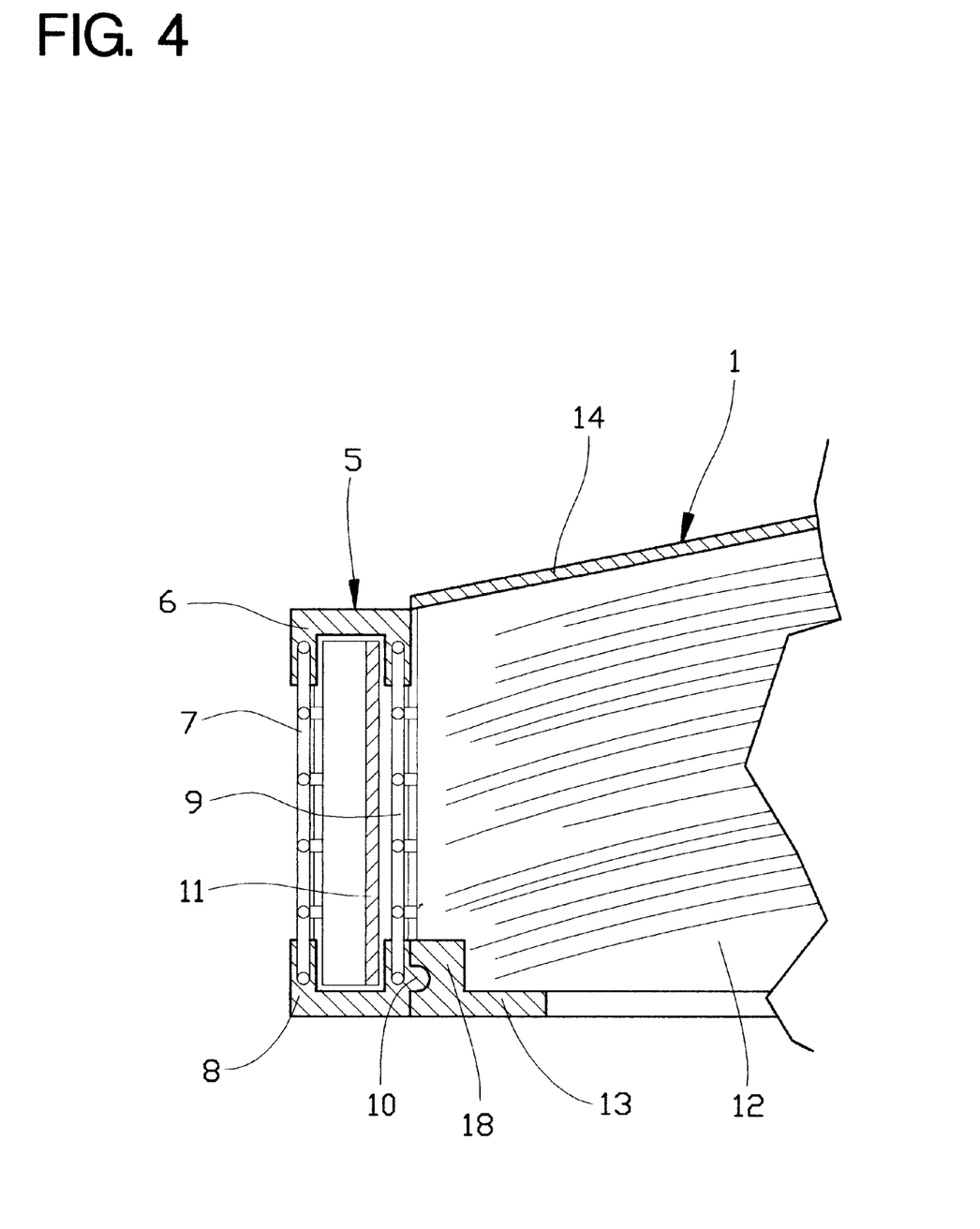
FIG. 4 is a magnified view of a portion of FIG. 3.
Figure 5:
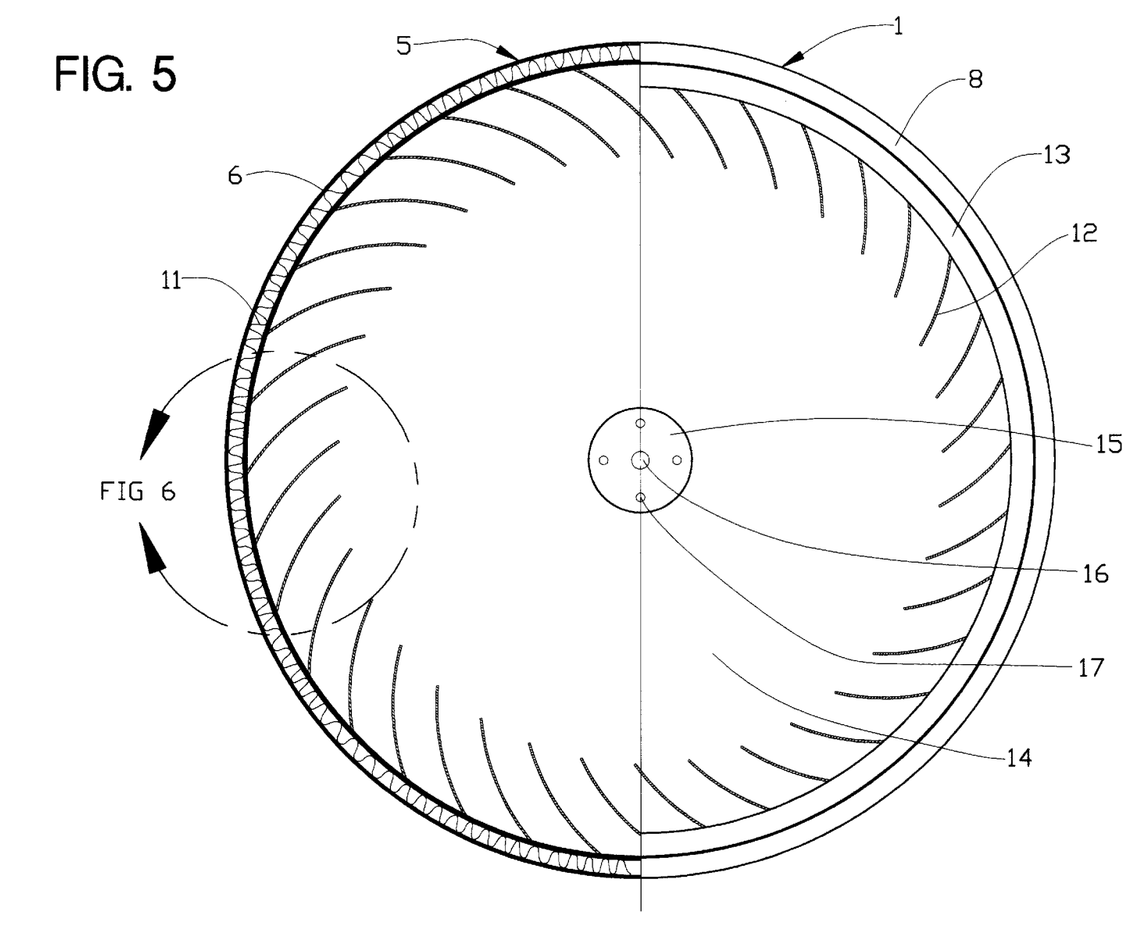
FIG. 5 is a plan, partially sectional, view of the air filtering device, viewed from below; the plane of the section passing horizontally through such device.

Referring simultaneously to FIGS. 1 and 4, the lower outer edges of the fan blades 12 are structurally supported by a support ring 18 having an inwardly extending annular flange 13, the lower outer edges of the fan blades 12 preferably being homogeneously fused with the inner surfaces of the support ring 18, and fused with the upper surface of the annular flange 13. Referring simultaneously to FIGS. 2 and 4, the outwardly facing peripheral surface of the support ring 18 preferably has a snap ridge receiving channel 24 extending annularly therearound.

Referring to FIG. 1, drawing element 5 refers generally to an air filter retaining frame containing a filtering medium. Referring to FIG. 2, the snap ridge receiving channel 24 serves the function of holding in place the air filter retaining frame and air filter 5. Referring simultaneously to FIGS. 1 and 4, the air filter retaining frame and air filter 5 comprise a downwardly opening U-channel ring 6 and an upwardly opening U-channel ring 8. A pair of concentric air permeable wire grids 7 and 9 span between and interconnect the U-channel rings 6 and 8; the U-channel rings 6 and 8 and the wire grids 7 and 9 defining an interior cylindrical space for containing an air filtering medium 11. The air filtering medium 11 as depicted is a pleated fiberglass mesh. Other suitable air filtering media are: activated charcoal, pleated woven fabric filters which are either chemically treated or impregnated with activated charcoal, high efficiency particle arresting (HEPA) filters, or combinations of such filters.

Referring simultaneously to FIGS. 2 and 4, a snap ridge 10 extends inwardly from the inwardly facing surface of the lower U-channel ring 8, the snap ridge 10 being fitted for retention by the snap ridge receiving channel 24.

Figure 6:
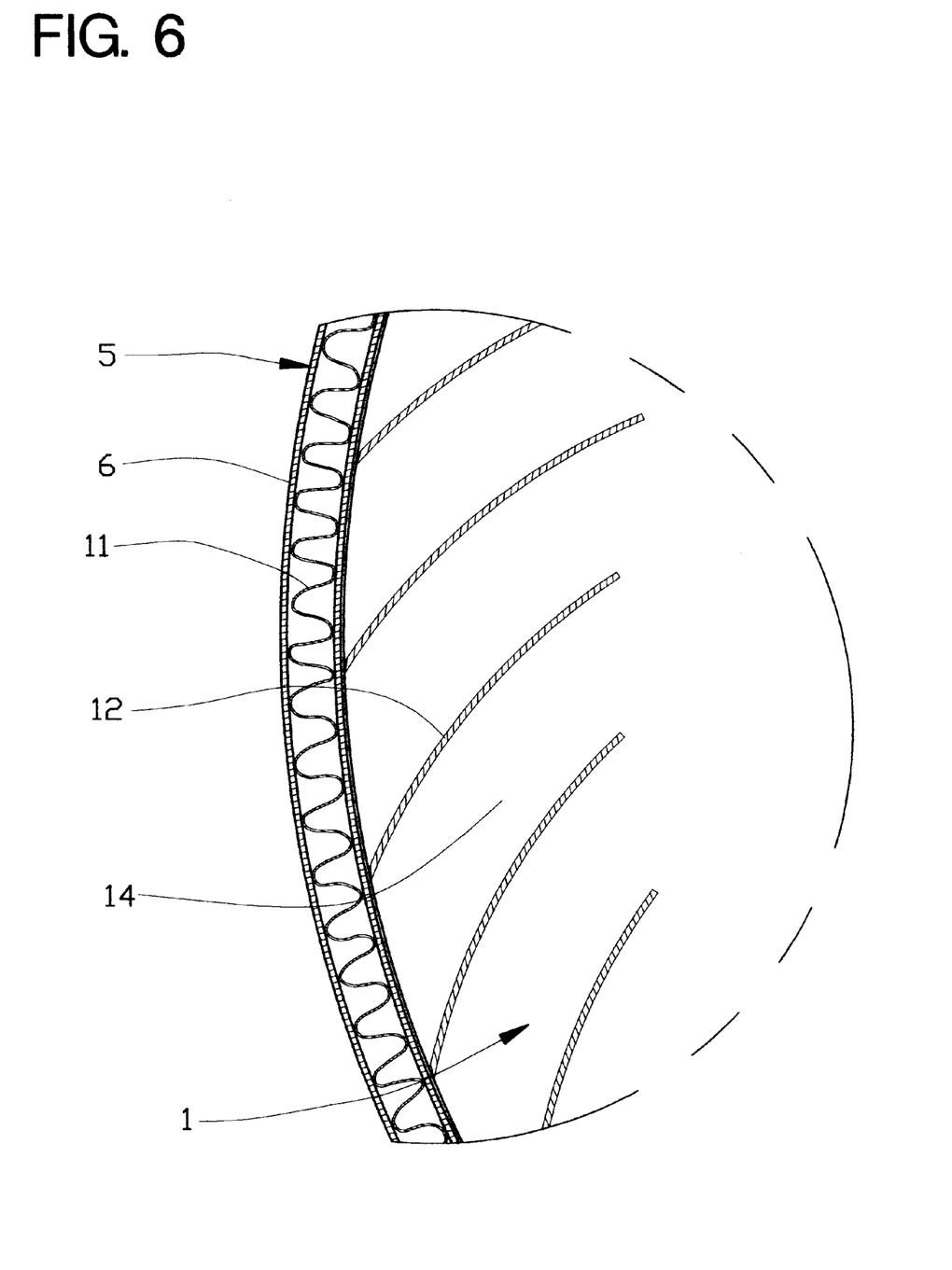
FIG. 6 is a magnification of a portion of FIG. 5.

Referring to FIG. 2, in operation of the air filtering device, the ceiling fan motor 20 is operated to rotate the upper circular plate 14 and the fan blades 12 in a clockwise fashion. Upon such rotation, air is accelerated radially outward through the openings 19 between the fan blades 12. Referring to FIG. 1, the air then passes through the air filtering retaining frame 5, and, referring to FIG. 6, through the air filtering medium 11 contained therein. As the air passes through the air filtering medium 11, the air is filtered and cleaned.

Preferably, the circular plate 14, the fan blades 12, the support ring 18, and the flange 13 are formed through a plastic injection molding process. Also preferably, referring to FIG. 4, the upper and lower U-channel rings 6 and 8 are formed through a plastic injection molding process.

Referring to FIG. 1, the air filtering device 1 provides advantages of economy in construction. The circular plate 14, the fan blades 12, and the support ring 18 may be economically constructed from injection molded plastic. The air filter retaining frame 5, along with filtering media contained therein may be inexpensively constructed allowing for economic disposal and replacement. The air filtering device 1 also economically saves power allowing a single electric motor to provide room air flow and air filtration. The air filtering device 1 further provides economy in space usage; taking up virtually no living or working space where it is installed and used. The air filtering device 1 additionally enhances the overall atmosphere of a room where it is installed and used by circulating and filtering the air while generating virtually no background noise.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative only, and not in any limiting sense, and it is intended that the invention be given a scope commensurate with the appended claims.

I claim:

1. An air filtering device comprising:
    (a) A circular plate having a central radial axis, having an outer peripheral edge, having an upper surface, and having a lower surface;
    (b) A plurality of fan blades, each fan blade having an inner edge and an outer edge, each fan blade being fixedly attached to or homogeneously fused with the circular plate, each fan blade being positioned upon the circular plate so that it extends downwardly from the lower surface of the circular plate, and so that its outer edge faces outwardly away from the central radial axis of the circular plate;
    (c) A filter frame having an air permeable cylindrical inner wall, the air permeable cylindrical inner wall having an upper end and a lower end, the air permeable cylindrical inner wall being fitted for mounting over the outer edges of the fan blades; the filter frame having an upper wall fixedly attached to and extending radially outward from the upper end of the air permeable cylindrical inner wall; the filter frame having a lower wall fixedly attached to and extending radially outwardly from the lower end of the air permeable cylindrical inner wall; the filter frame having an air permeable cylindrical outer wall fixedly attached to and spanning between the upper and lower walls; the air permeable cylindrical inner wall, the air permeable cylindrical outer wall, the upper wall and the lower wall defining a cylindrical filter media containing space;
    (d) Air filtering media extending annularly around the air permeable cylindrical inner wall within the cylindrical filter media containing space; and
    (e) Means for directly attaching the filter frame to the outer edges of the fan blades wherein the air permeable cylindrical inner wall annularly surrounds the outer edges of the fan blades so that air flowing between the fan blades may thence flow through the filter frame for filtration by the air filtering media contained with the cylindrical filter media containing space.

2. The device of claim 1, wherein each fan blade is angularly aligned with respect to the outer peripheral edge of the circular plate; and wherein each fan blade is outwardly arcuately curved.

3. The device of claim 2, wherein the circular plate has a plurality of screw receiving apertures therethrough, the screw receiving apertures being positioned so that screws passing therethrough may fixedly and rotatably attach the circular plate to a rotor plate of a ceiling fan.

4. The device of claim 3, wherein the air filtering media comprises activated charcoal.

5. The device of claim 3, wherein the air filtering media comprises a fiberglass mesh.

6. The device of claim 3, wherein the air filtering media comprises a high efficiency particle arresting (HEPA) filter.

7. The device of claim 3, wherein the air filtering media comprises a woven filtering fabric.

8. The device of claim 4, wherein the air permeable cylindrical inner wall of the filter frame comprises an inner wall of an upwardly opening U-channel ring, said inner wall of the upwardly opening U-channel ring having an inwardly facing peripheral surface.

9. An air filter device comprising:
    means for mounting the device to a rotation-imparting power source;
    air filtration means connected to the mounting means; and
    air acceleration means for directing air generally radially with respect to the axis of rotation, the air acceleration means connected to the mounting means and directly attached to the air filtration means;
    whereby the power source is adapted to rotate the mounting means, the air filtration means and the air acceleration means in unison to cause the air acceleration means to direct a flow of air through the air filtration means.

10. The air filtration device of claim 9 wherein the power source is a ceiling fan motor.

11. The air filtration device of claim 10 wherein the air filtration means is disposed annularly on a lower surface of the mounting means.

12. The air filtration device of claim 11 wherein the air acceleration means is disposed annularly on the lower surface of the mounting means radially inwardly of the air filtration means.

13. An air filtering device comprising:
    means for mounting the device to a ceiling fan motor, the mounting means having a lower surface;
    annular air filtration means connected to the lower surface of the mounting means; and
    annular air acceleration means connected to the lower surface of the mounting means and disposed in direct fixed relationship to the air filtration means for movement with the same.

14. The device of claim 13 wherein the air acceleration means includes a plurality of fins adapted to create a flow of air into the air filtration means.

15. The device of claim 14 wherein the mounting means includes means for selectively securing the air filtration means.

16. The device of claim 15 wherein the air acceleration means is disposed radially inwardly of the air filtration means.

17. The device of claim 16 wherein the mounting means is generally conically shaped and opening downwardly from the ceiling fan motor.

18. An air filtering device comprising:

means for mounting the device to a rotation imparting power source;

air filtration means for substantially impeding the flow of non-gaseous matter therethrough, the air filtration means connected to the mounting means;

air acceleration means connected to the mounting means and directly attached to the air filtration means;

whereby the power source is adapted to rotate the mounting means, the air filtration means and the air acceleration means in unison to cause the air acceleration means to direct a flow of air through the air filtration means.

* * * * *